United States Patent
Umeno (10) Patent No.: US 6,661,831 B1
(45) Date of Patent: Dec. 9, 2003

(54) OUTPUT APPARATUS, TRANSMITTER, RECEIVER, COMMUNICATIONS SYSTEM FOR OUTPUTTING, TRANSMITTING AND RECEIVING A PSEUDORANDOM NOISE SEQUENCE, AND METHODS FOR OUTPUTTING, TRANSMITTING RECEIVING PSEUDORANDOM NOISE SEQUENCES AND DATA RECORDING MEDIUM

(75) Inventor: Ken Umeno, c/o Communications Research Laboratory, Ministry of Posts and Telecommunications, 2-1, Nukuikitamachi 4-chome, Koganei-shi, Tokyo 184-8795 (JP)

(73) Assignees: Communications Research Laboratory, Ministry of Posts and Telecommunications, Tokyo (JP); Ken Umeno, Tokyo (JP)

( * ) Notice: Subject to any disclaimer, the term of this patent is extended or adjusted under 35 U.S.C. 154(b) by 636 days.

(21) Appl. No.: 09/641,305

(22) Filed: Aug. 18, 2000

(30) Foreign Application Priority Data

Aug. 19, 1999 (JP) .......................................... 11-232312

(51) Int. Cl.[7] .............................................. H04B 1/707
(52) U.S. Cl. ....................................................... 375/142
(58) Field of Search ................................. 375/130, 142, 375/143, 144, 146, 148, 149, 150, 152; 708/250; 331/78

(56) References Cited

U.S. PATENT DOCUMENTS

| 4,991,218 A | * | 2/1991 | Kramer ....................... 381/61 |
| 6,263,146 B1 | * | 7/2001 | Umeno et al. ............... 385/147 |

OTHER PUBLICATIONS

K. Umeno and K. Kitayama, Electronics Letters (1999) vol. 35, pp. 545–546.
K. Umeno and K. Kitayama, Proc. 1999 IEEE Information Theory and Communications Workshop, p. 106.

* cited by examiner

*Primary Examiner*—Don N. Vo
(74) *Attorney, Agent, or Firm*—Luce, Forward, Hamilton & Scripps LLP (57) ABSTRACT

A PN sequence output apparatus outputs a PN sequence which is generated by using a Chebyshev polynomial $T(a, \cos \theta) = \cos(a\theta)$ for an integer $a$ ($2 \leq a$) and which has a length $N$ ($1 \leq N$). An accepting section accepts an $S$ ($1 \leq S$) number of initial values $X_1, X_2, \ldots, X_s$ each of which is a real number larger than $-1$ and less than $1$, and an $S$ number of degrees $p_1, p_2, \ldots, p_s$ each of which is an integral number equal to or larger than 2. A calculation section calculates a Pseudorandom Noise sequence, having a length $N$, $z[1]$, $z[2], \ldots, z[N]$, using the initial values, the degrees, and recurrence formulas $x_j[1]=X_j$, $x_j[m+1]=T(p_j, x_j[m])$, and $z[n]=\Pi_{j=1}^{s} T(p_j, x_j[n])$, for integers $j$ ($1 \leq j \leq S$), m ($1 \leq m \leq N-1$) and n ($1 \leq n \leq N$). An output section outputs a PN sequence. In this structure, direct spectrum spreading communication is established using the output PN sequence as a spreading code.

25 Claims, 7 Drawing Sheets

OUTPUT APPARATUS, TRANSMITTER, RECEIVER, COMMUNICATIONS SYSTEM FOR OUTPUTTING, TRANSMITTING AND RECEIVING A PSEUDORANDOM NOISE SEQUENCE, AND METHODS FOR OUTPUTTING, TRANSMITTING RECEIVING PSEUDORANDOM NOISE SEQUENCES AND DATA RECORDING MEDIUM

BACKGROUND OF THE INVENTION

1. Field of the Invention

The present invention relates to an output apparatus, a transmitter, a receiver which respectively outputs, transmits and receives PN (Pseudorandom Noise) sequences, a communications system, methods for outputting, transmitting and receiving PN sequences, and a data recording medium. More particularly, the present invention relates to an apparatus and method suitable for outputting PN sequences as spreading codes in CDMA (Code Division Multiple Access) for spread spectrum communications which is useful for satellite communications, cable communications, mobile communications such as cellular telephony and PHS (Personal Handy-phone System), and ranging such as GPS (Global Positioning System), and also to a transmitter, a receiver, a communications system, a PN sequence transmitting method, a PN sequence receiving method, and a data recording medium all of which employ the above apparatus and the method.

2. Description of the Related Art

Spread spectrum communication technology such as CDMA technique has employed PN sequences as spreading sequences for secure communications and efficient sharing of limited radio frequency resources.

Conventionally, the maximum length code (M-sequence), Gold code, Kasami code, and the like have been utilized to generate the PN sequences. Those code systems usually calculate the PN sequences by using linear shift register circuits and EXCLUSIVE-OR circuits. However, it is difficult to establish security of communications because the PN sequences based on the above code system are binary sequences which are cracked easily.

The spread spectrum communications requires synchronization between communication terminals. However, this synchronization involves a trade-off. The trade-off is between enhancing the security of communications and the synchronization of the PN sequences at the receivers.

In industry, there has been demands for technique for outputting PN sequences which realize more enhanced security as compared to the conventional PN sequences. Chaos theory, which is one of growth studies, has been focused on as a theory which realize more enhanced secure CDMA communications by generating hard-to-detect PN sequences.

However, chaos based PN sequences require a receiver to search a target sequence in a huge sequence space for code synchronization. Therefore, a simple code synchronization technique has also been demanded.

The present invention has been made in consideration of the above problems. It is accordingly an object of the present invention to provide an output apparatus for outputting PN (Pseudorandom Noise) sequences, a transmitter, a receiver, a communications system, methods for outputting, transmitting and receiving PN sequences, and a data recording medium.

More particularly, it is an object of the present invention to provide an apparatus and method suitable for outputting PN sequences as spreading codes in CDMA for spread spectrum communications, and a transmitter, a receiver, a communications system, a PN sequence transmitting method, a PN sequence receiving method, and a data recording medium all of which employ the above apparatus and the method.

SUMMARY OF THE INVENTION

In order to achieve the above objects, the following inventions will be disclosed in accordance with the principles of the present invention.

A Pseudorandom Noise sequence output apparatus according to the present invention may be an output apparatus, for outputting a Pseudorandom Noise sequence having a length N ($1 \leq N$) and being generated using a Chebyshev polynomial $T(a, \cos \theta) = \cos(a\theta)$, for an integer $a$ ($2 \leq a$), which comprises an accepting section, a calculation section and an output section.

The accepting section accepts an S ($1 \leq S$) number of initial values each of which is a real number larger than $-1$ and less than 1

$X_1, X_2, \ldots, X_s$, and an S number of degrees each of which is an integral number equal to or larger than 2

$p_1, p_2, \ldots, p_s$.

The calculation section calculates a Pseudorandom Noise sequence having a length N $z[1], z[2], \ldots, z[N]$ using the accepted initial values, the degrees and recurrence formulas $x_j[1] = X_j$;

$x_j[m+1] = T(p_j, x_j[m])$; and $z[n] = \Pi_{j=1}^{s} T(p_j, x_j[n])$.

The output section outputs the calculated Pseudorandom Noise sequence.

The initial values to be received in the PN sequence output apparatus of the present invention may all be rational numbers.

A transmitter of the present invention comprises a signal accepting section, a sequence output section, a spreading section and a transmitting section.

The signal accepting section accepts a transmission signal to be input therein.

The sequence output section controls the Pseudorandom Noise sequence output apparatus to accept predetermined initial values and predetermined degrees and to output a PN sequence.

The spreading section multiplies the accepted transmission signal sequentially by elements of the output Pseudorandom Noise sequence so as to perform direct spectrum-spreading.

The transmitting section transmits the signal which is direct-spectrum spread.

A receiver of the present invention comprises a signal accepting section, a sequence output section and an inverse spreading section.

The signal receiving section receives the signal transmitted by the transmitter.

The sequence output section controls the PN sequence output apparatus to accepts same initial values as initial values accepted by the transmitter and same degrees as degrees accepted by the transmitter and to output a Pseudorandom Noise sequence.

The inverse spectrum spreading section multiplies the received signal sequentially by inverse number of elements of the output Pseudorandom Noise sequence, perform direct inverse-spectrum spreading, and decrypt the transmission signal accepted by the transmitter.

A receiver of the present invention comprises a signal receiving section, a generation section, a sequence output section, a correlation detection section, and an inverse spreading section.

The signal receiving section receives a signal transmitted from the transmitter.

The generation section generates initial values and degrees.

The sequence output section controls the Pseudorandom Noise sequence output apparatus to accepts the generated initial values and degrees and to output a Pseudorandom Noise sequence.

The correlation detection section multiplies the received signal sequentially by elements of the output Pseudorandom Noise sequence so as to perform correlation detection.

The inverse spreading section multiplies the received signal sequentially by inverse numbers of elements of the Pseudorandom Noise sequence which is in synchronization with the signal by the correlation detection, perform direct-inverse spectrum spreading, and decrypt the transmission signal received by the transmitter, when it is determined that the generated initial values and degrees are same as the initial values and degrees of the transmitter based on a result of the correlation detection.

A communications system of the present invention comprises the transmitter and the receiver which receives a signal transmitted by the transmitter.

A method of outputting a Pseudorandom Noise sequence is an output method for outputting a Pseudorandom Noise sequence having a length N ($1 \leq N$) and being generated using a Chebyshev polynomial $T(a, \cos \theta) = \cos(a\theta)$, for an integer $a$ ($2 \leq a$), and the method comprising an accepting step, a calculation step and an output step.

In the accepting step, accepted may be an S ($1 \leq S$) number of initial values each of which is a real number larger than $-1$ and less than 1

$X_1, X_2, \ldots, X_S$; and an S number degrees each of which is an integral number equal to or larger than 2

$p_1, p_2, \ldots, p_S$.

In the calculation step, calculated is a Pseudorandom Noise sequence having a length N $z[1], z[2], \ldots, z[N]$ using the accepted initial values, the degrees and recurrence formulas $x_j[1] = X_j$;

$x_j[m+1] = T(p_j, x_j[m])$;

$z[n] = \Pi_{j=1}^{s} T(p_j, x_j[n])$.

In the output step, the calculated PN sequence is output.

In the method of outputting a PN sequence according to the present invention, the initial values to be accepted may be rational numbers.

A method of transmitting a signal may comprise a signal accepting step, a sequence outputting step, a spreading step and a transmitting step.

In the signal accepting step, a transmission signal is accepted.

In the sequence outputting step, the method of outputting a PN sequence is controlled to include a step of accepting predetermined initial values and predetermined degrees and to output a Pseudorandom Noise sequence.

In the spreading step, the accepted transmission signal is multiplied sequentially by elements of the output Pseudorandom Noise sequence, and direct spectrum-spreading may be performed.

In the transmitting step, the signal which is direct-spectrum spread is transmitted.

A method of receiving a signal may comprise a signal receiving step, a sequence outputting step, and an inverse spreading step.

In the signal receiving step, a signal is received.

In the sequence output process, the method of outputting a Pseudorandom Noise sequence is controlled to include a step of accepting predetermined initial values and predetermined degrees and to output a PN sequence.

In the inverse spreading step, the received signal is multiplied sequentially by inverse numbers of elements of the Pseudorandom Noise sequence, direct-inverse spectrum spreading is performed, and a transmission signal may be decrypted.

A method of receiving a signal comprises a signal receiving step, a generating step, a sequence output step, a correlation detecting step, and an inverse spreading step.

In the signal receiving step, a signal is received.

In the generating step, initial values and degrees are generated.

In the sequence outputting step, the method of outputting a PN sequence is controlled to include a step of accepting the generated initial values and degrees and to output a Pseudorandom Noise sequence.

In the correlation detecting step, the received signal is multiplied sequentially by elements of the output Pseudorandom Noise sequence, and correlation detection is performed.

In the inverse spreading step, the received signal is multiplied sequentially by inverse numbers of elements of the Pseudorandom Noise sequence which is synchronized with the signal, direct-inverse spectrum spreading may be performed, and a transmission signal is decrypted, in a case where the generated initial values and degrees meet a predetermined condition based on the correlation detection.

A program for realizing processes, to be executed by the PN sequence output apparatus, the transmitter, the receiver and the communications system of the present invention, and realizing the method of outputting a PN sequence, the method of transmitting a signal and the method of receiving a signal, may be recorded on a data recording medium, according to the present invention, such as a compact disk, a floppy disk, a hard disk, a magneto-optical disk, a digital video disk, a magnetic tape and a semiconductor memory.

The program recorded on the data recording medium according to the present invention may be executed by: a general-purpose computer including a storage device, a calculation device, an output device and a communications device; a mobile terminal including a cellular phone, a PHS and a game machine; and a data processor including a parallel calculator. In this structure, those processes to be executed by the PN sequence output apparatus, the transmitter, the receiver and the communications system, and the method of outputting a PN sequence, the method of transmitting a signal and the method of receiving a signal can be realized.

The data recording medium storing the program according to the present invention may be distributed or sold as a single product independent from the data processor.

The program stored on the data recording medium may be transferred using a carrier wave, as a computer data signal.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENTS

One embodiment of the present invention will now be explained. The below-described embodiments are for explanatory purposes only, and are not intended to limit the scope of the present invention. It would be obvious to those skilled in the art to apply any element or the principle structure of the present invention to other forms of apparatuses. Various embodiments and changes may be made thereonto without departing from the broad spirit and scope of the invention. Various modifications made within the meaning of an equivalent of the claims of the invention and within the claims are to be regarded to be in the scope of the present invention.

First Embodiment

Figure 1:
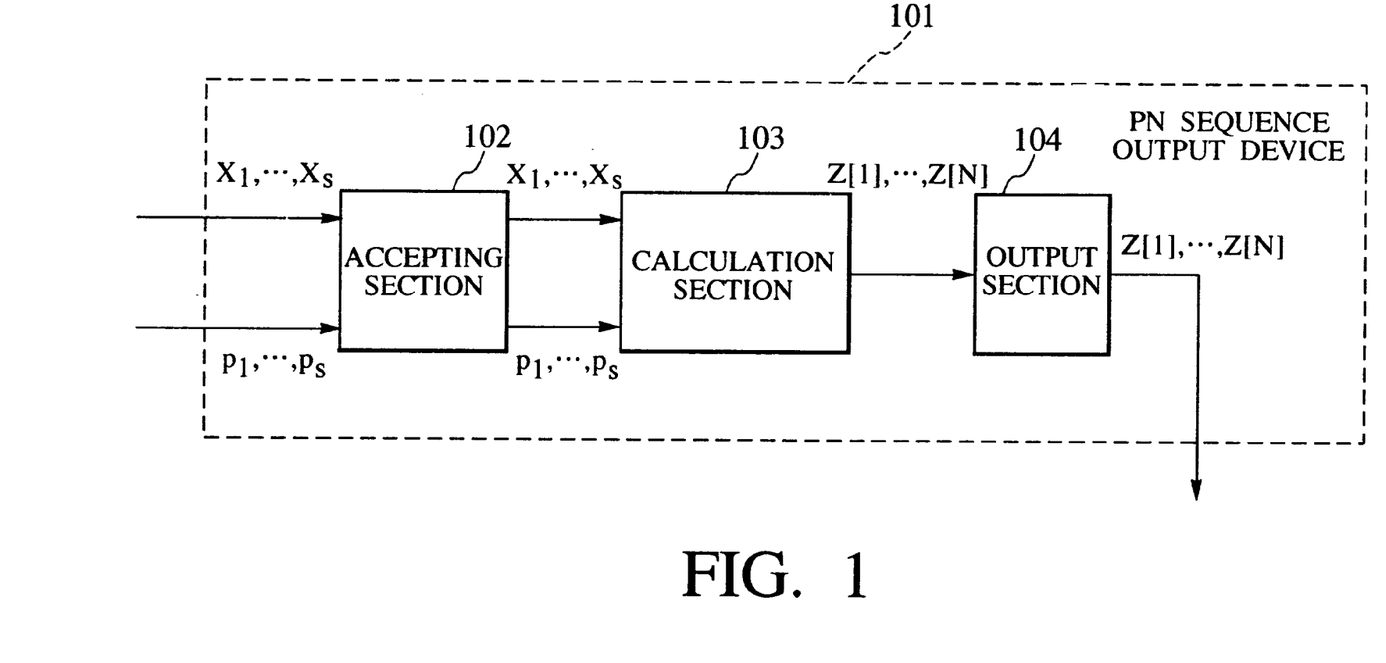
FIG. 1 is an exemplary diagram showing the schematic structure of a PN sequence output apparatus according to an embodiment of the present invention.

FIG. 1 is an exemplary diagram (data flow diagram) showing the schematic structure of a PN sequence output apparatus. Explanations will now specifically be made to the output apparatus with reference to FIG. 1.

The PN sequence output device 101 comprises an accepting section 102, a calculation section 103 and an output section 104.

The accepting section 102 accepts an "S" ($1 \leq S$) number of initial values $X_1, X_2, \ldots, X_S$, each of which is a real number, and an "S" number of degrees $p_1, p_2, \ldots, p_S$, each of which is an integral number. Such initial values and degrees need to meet the condition $-1 < X_j < 1$, $2 \leq p_j$, for an integer j ($1 \leq j \leq S$).

The calculation section 103 generates a Pseudorandom Noise sequence $z[1], z[2], \ldots, z[N]$ having a length N ($1 \leq N$), using the initial values and the degrees accepted by the accepting section 102 and Chebyshev polynomials. The output section 104 outputs the Pseudorandom Noise sequence generated by the calculation section 103.

Figure 2:
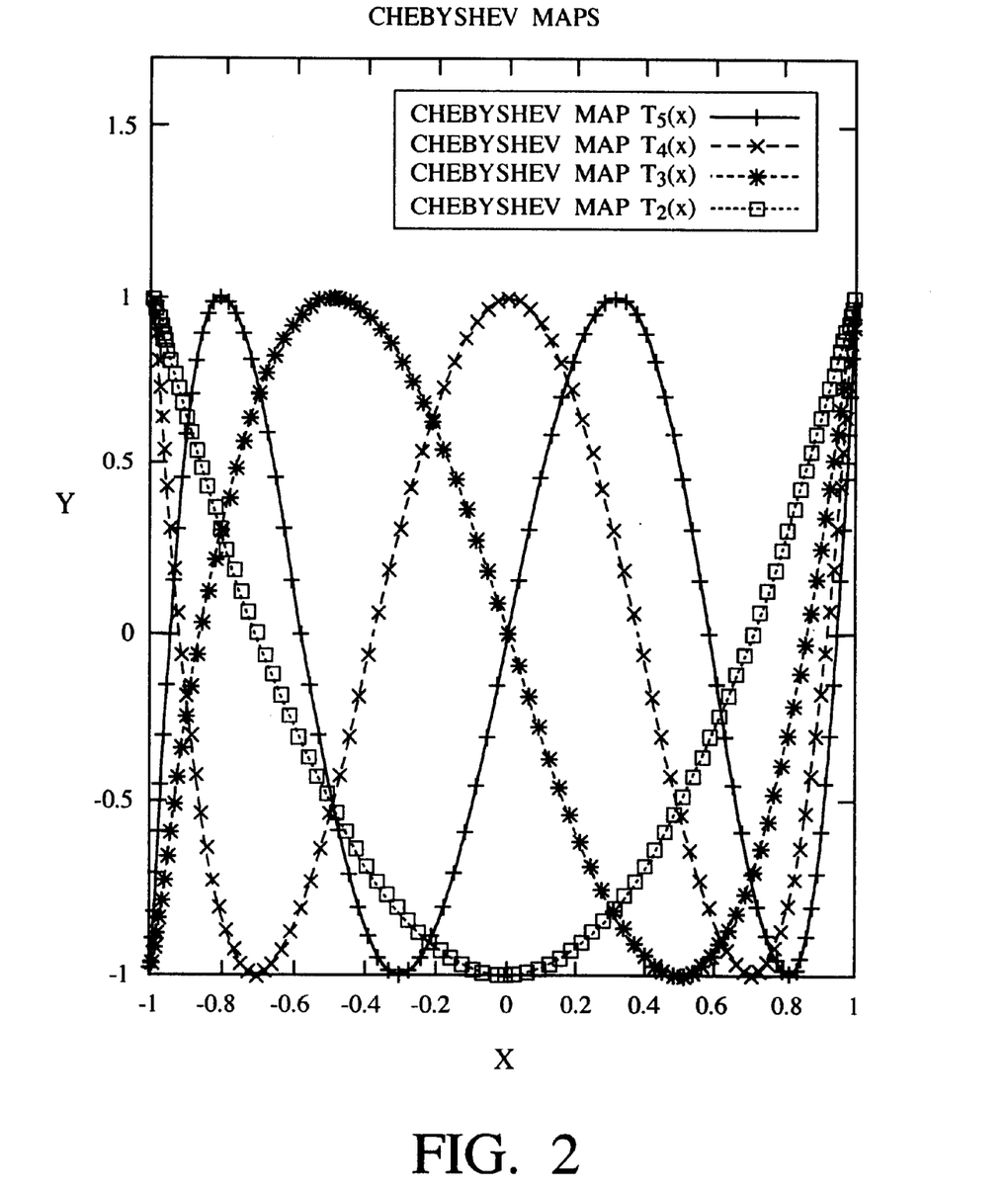
FIG. 2 is a graph representing Chebyshev polynomials.

FIG. 2 is a graph representing Chebyshev polynomials. A Chebyshev polynomial can be defined by an addition theorem of a cosine function $$T(a, \cos \theta) = \cos(a\theta)$$

where an integer a is a degree.

Alternatively, a Chebyshev polynomial can directly be defined by a rational polynomial $$T(2, x) = 1 - x^2$$

$$T(3, x) = 4x^3 - 3x$$

where a Chebyshev polynomial $y = T(a, x)$ is a rational map for mapping an open interval $-1 < x < 1$ into another open interval $-1 < y < 1$.

FIG. 2 illustrates the graph representing Chebyshev polynomials (Chebyshev maps) having degrees of 2 to 5 which are plotted respectively for $y = T(2, x)$, $y = T(3, x)$, $y = T(4, x)$, $y = T(5, x)$, where the horizontal axis is identified as the x-axis and the vertical axis as the y-axis.

Calculations to be executed by the calculation section 103 can be realized, not only by a computer which can perform polynomial calculations with Horner's method, but also by a combination of an addition/subtraction circuit and a multiplication circuit. In addition, the calculations may be realized by performing floating-point calculations wherein a high degree of precision can be assured, or may also be realized by performing calculations with rational numbers.

The accepting of the initial values and degrees as performed by the accepting section 102 and the outputting of the PN sequence by the output section 104 can be carried out through a RAM (Random Access Memory) or a register in a CPU (Central Processing Unit) in the case of a computer, or through the utilization of a latch, etc. in the case of an electronic circuit.

It is proven that thus obtained PN sequences show better correlation properties for CDMA as compared to the conventional M-sequence, the Gold code and the Kasami code, based on the fact that correlation properties of the above PN sequences are nearly orthogonal in a case where CDMA employs the above PN sequences as spreading sequences (Ref. 1: K. Umeno and K. Kitayama, Electronics Letters (1999) vol. 35, pp. 545–546; Ref. 2: K. Umeno and K. Kitayama, Proc. 1999 IEEE Information Theory and Communications Workshop, p. 106). Further, it is obvious that the PN sequences to be generated in accordance with the technique of the present invention show the same correlation properties to those shown by Ref. 2 presenting correlation functions in the form of 2S dimensional multiple integral.

Those calculations to be processed by the calculation section 103 are done based on recurrence formulas $$x_j[1] = X_j;$$

$$x_j[m+1] = T(p_j, x_j[m]);$$

$$z[n] = \Pi_{j=1}^{S} T(p_j, x_j[n]), \text{ for integers } j(1 \leq j \leq S), m(1 \leq m \leq N-1), n(1 \leq n \leq N).$$

Here, Π denotes a calculation which sign is generally employed, likewise the sign Σ, in the field of mathematics. Such denotations can be defined as follows:

$$\Sigma_{i=1}^{n} a_i = a_1 + a_2 + \ldots a_n$$

$$\Pi_{i=1}^{n} a_i = a_1 \times a_2 \times \ldots a_n$$

As obvious from the above recurrence formulas, those calculations for obtaining $z[1], z[2], \ldots, z[N]$ are dependent from each other, thus can parallelly be performed with an N number of parallel processors so as to achieve maximum parallelism. In addition, such calculations are described in the form of recurrence formula, thus can easily be processed through repeat operations or loop operations.

Figure 3:
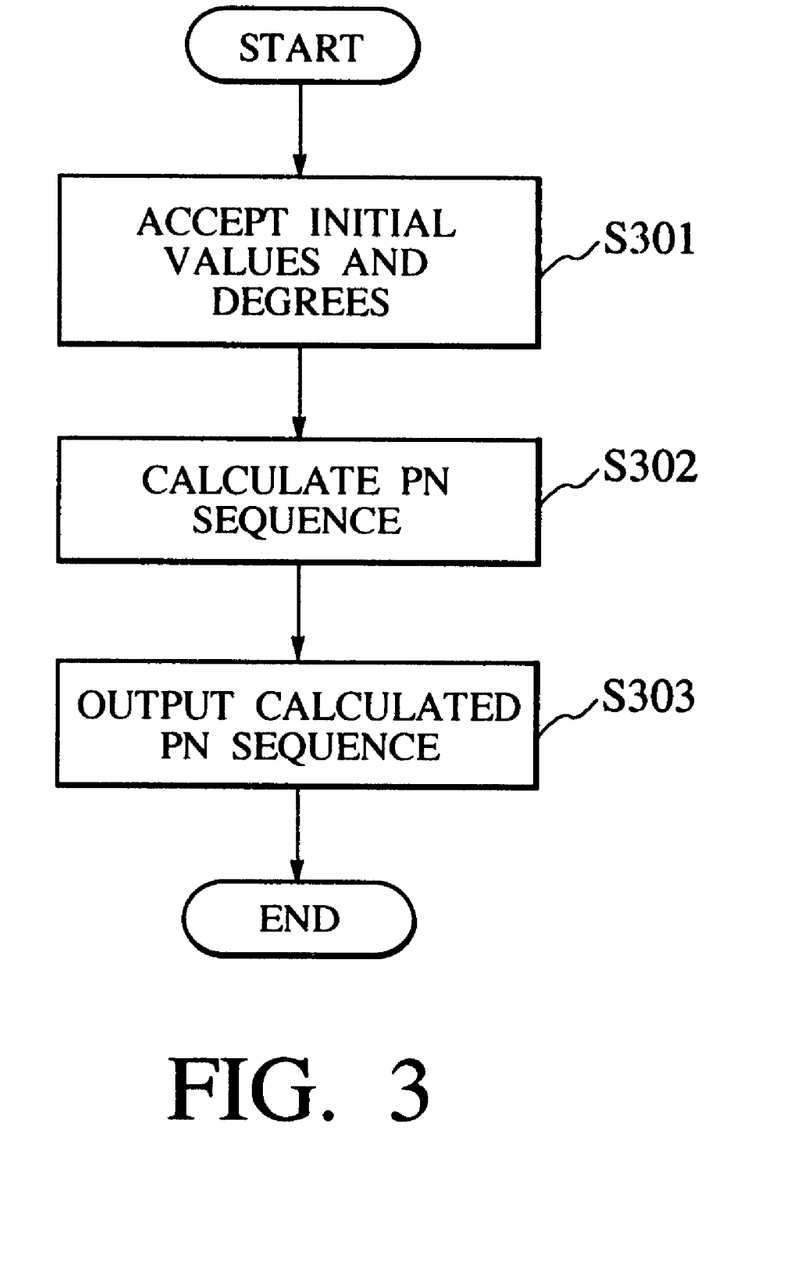
FIG. 3 is a flowchart showing a process of outputting a PN sequence.

FIG. 3 is a flowchart showing a process to be carried out by the PN sequence output device 101, i.e., a process of outputting PN sequences according to the present invention. The PN sequence output device 101 accepts initial values and degrees (Step S301), calculates a PN sequence based on the received initial values, the degrees and the above recurrence formulas (Step S302), and outputs the calculated PN sequence (Step S303), and the process of outputting PN sequences ends.

Accordingly, the process of outputting PN sequences according to the present invention can easily be carried out with using a general-purpose computer, a parallel computer, a portable terminal, and particularly, any data processing apparatus such as a communications terminal and a game machine.

Second Embodiment

Figure 4:
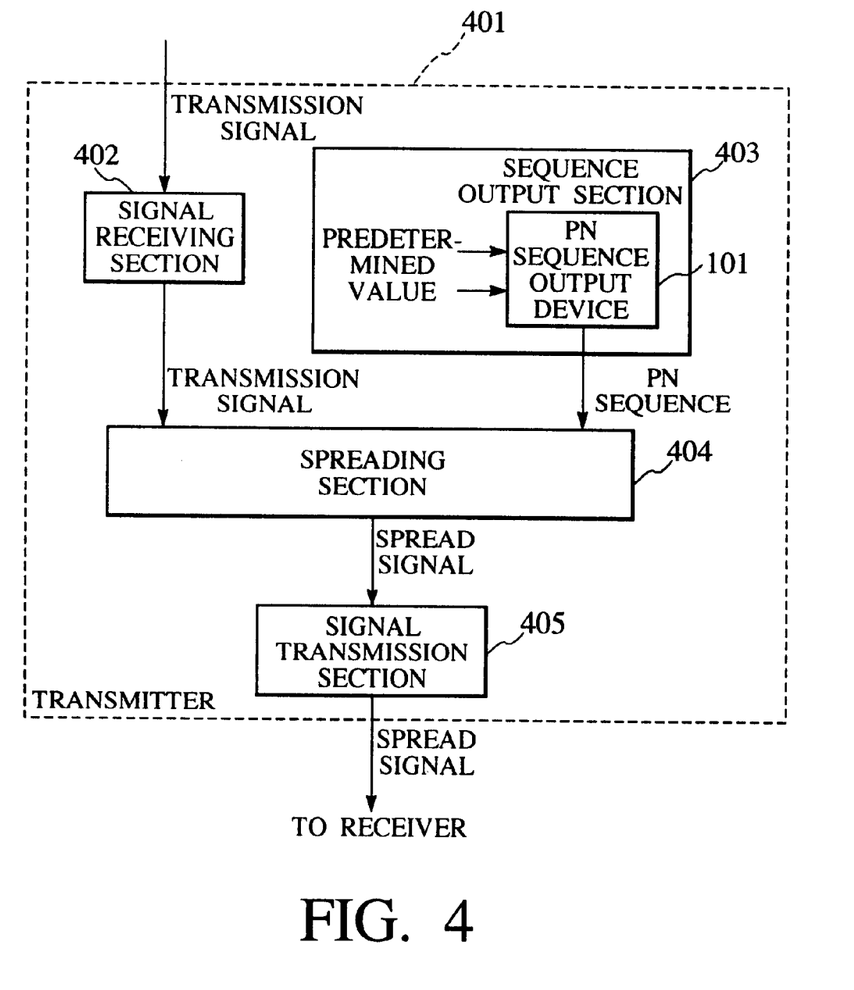
FIG. 4 is an exemplary diagram showing the schematic structure of a transmitter according to the present invention.

FIG. 4 is an exemplary diagram showing the schematic structure of a transmitter of the present invention. Those same components are denoted by the same reference numerals as those in FIG. 1. Explanations will now be made to the transmitter with reference to FIG. 4.

A transmitter 401 comprises a signal accepting section 402, a sequence output section 403, a spreading section 404 and a signal transmission section 405. The sequence output section 403 includes a PN sequence output device 101, and controls the same.

The signal accepting section 402 accepts any signal to be transmitted. A typical example of the signal to be transmitted is a speech signal in the case of a cellular phone or a PHS (Personal Handyphone System). On the contrary, the signal to be transmitted is a digital signal in the case of performing digital communications between terminals. Further, in the case of performing optical-data communications, the signal accepting section 402 may accept any electronic signal after converted from an optical signal, or the signal accepting section 402 may accept an optical signal as is in the case where the PN sequence output device 101 is realized in an optical computer.

The sequence output section 403 controls the PN sequence output device 101 included therein to receive initial values and degrees which are assigned to the transmitter 401. The PN sequence output device 101 outputs, as described earlier, a PN sequence, thus the sequence output section 403 is to output the PN sequence.

Each of a plurality of transmitters 401 can be assigned initial values and degrees which are different from those of other transmitters. Those communications terminals, wherein values respectively representing its serial number, machine number, and authorization number are stored in a ROM (Read Only Memory), are commonly used. Similarly, the transmitter 401, having the structure wherein a corresponding initial value and degree are stored in a ROM, can use the same initial value and degree every time those data are needed. Another technique is that various initial values and degrees for use are stored in a ROM, and are randomly selected every time data communications are carried out.

In the case where such an embodiment is employed, it is necessary that the initial value and the degree stored in the ROM are acquired by some means on the receiver communicating with the transmitter 401. However, in the case where there is a transmitter-receiver pair, an embodiment wherein the same initial value and the same degree can commonly be stored between the two may be employed.

In a case where various initial values and various degrees are prepared, it is detected which one of initial values and one of degrees the transmitter uses through correlation detection, as will be explained later. A plurality of initial values may be prepared using chaotic random number sequences which are obtained by recurrence formulas based on a Chebyshev polynomial. Further, as described later, through public key cryptosystem, secure sharing of the common initial value and the degree as the common secret keys can be realized between the transmitter 401 and the receiver.

The spreading section 404 multiplies the transmission signal received by the signal accepting section 402 sequentially by the elements of the PN sequences output by the sequence output section 403, thereby to perform direct spectrum spreading. A technique for "multiplying a signal s(t) sequentially by the members of a sequence", where a value of a signal at the time t is defined as s(t), will now be explained.

In the case of using elements of a sequence having a length N, the cycle, at which "multiplying a signal s(t) sequentially by the members of a sequence" is performed, can be denoted by Nw, on the basis of the length N and a chip length w of the direct spectrum spreading.

In the case of "multiplying a signal s(t) sequentially by the members of a sequence" since a predetermined time to, the signal s(t) is discrete by a chip length w which is short enough to establish data communications and to decrypt spread data. For example, there are a technique for deriving the value of signal s(t) per chip length, and a technique for deriving an average value of the values of signals s(t) between chip lengths w. In this embodiment of the present invention, for the sake of clear description, explanations will now be made to the former technique for deriving the value of signal s(t) per chip length.

It is necessary that the chip length w is so set that data of the transmission signal can satisfactorily be decrypted on the receiver side. A proper chip length can be selected using a well-known technique.

If the proper chip length w is selected, the discrete signal sequences are sequentially output during the selected chip length w, thereby obtaining a satisfactory signal with respect to the original transmission signal can be obtained.

The discrete signal sequences can be expressed as follows:

$$s(t_0), s(t_0+w), s(t_0+2w), s(t_0+3w), s(t_0+4w), \ldots$$

The above discrete signal sequences can be arranged for integer i ($0 \leq i$) as follows:

$$s_i = s(t_0 + iw).$$

According to the technique for finding the average of the values of the signals s(t) between the chip lengths w, the above discrete sequences can be arranged as follows:

$$s_i = (1/w) \int_0^w s(t_0 + iu) du$$

Such signal sequences $s_i$ ($0 \leq i$) are those transmission signals in a satisfactory state of the discrete form.

The above signal sequences are directly spectrum spread:

$s_0z[1], s_1z[2], \ldots, s_{n-1}z[N], s_nz[1], s_{n+1}z[2] \ldots$

That is, for integer i ($0 \leq i$), the general term for these sequences is $s_iz$ [(i mod N)+1]. Here, the term "x mod y" represents the remainder which is left over in a division operation wherein x is divided by y.

Figure 5A:
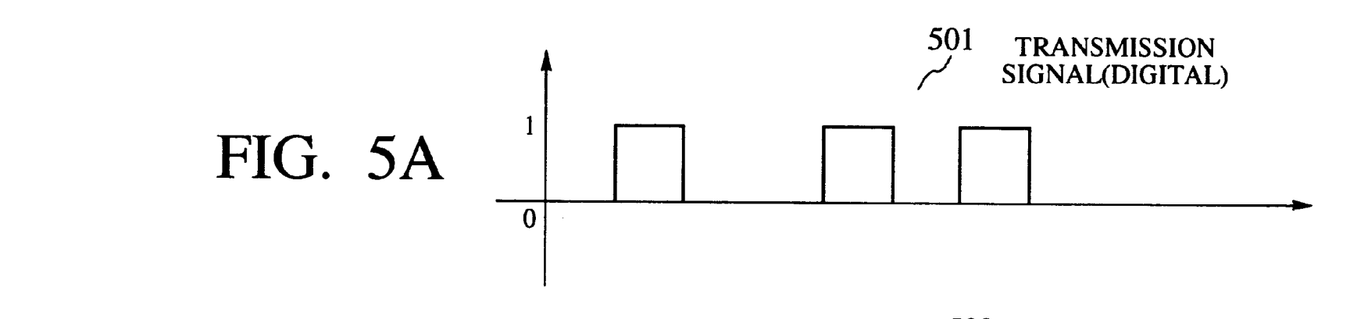
FIGS. 5A to 5C are explanatory diagrams each showing a signal which is direct-spectrum spread by the transmitter according to the present invention.
Figure 5B:
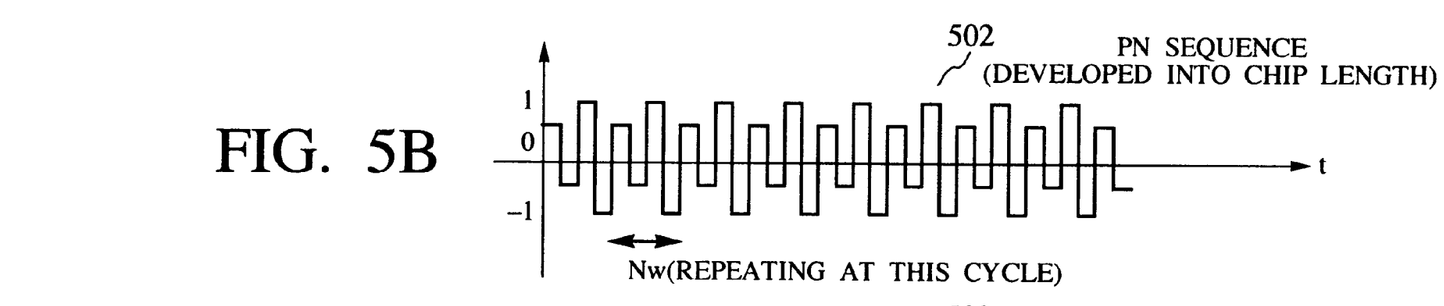
Figure 5C:
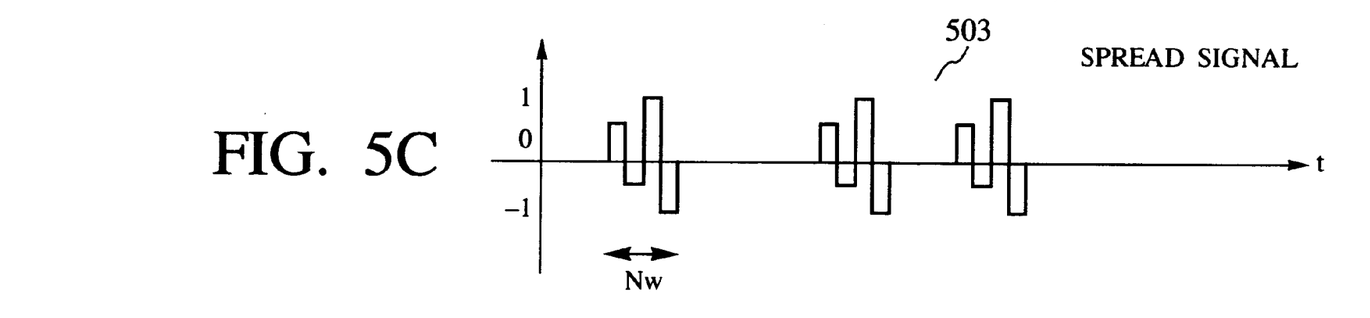

The elements in the signal sequences are each transmitted just for a time period corresponding to its chip length, thereby the received transmission signals each having a predetermined time length can be transmitted for the same time length. FIGS. 5A to 5C each illustrates a signal which is direct-spectrum spread. A transmission signal 501 accepted by the signal accepting section 402 is multiplied repeatedly by elements of a PN sequence output by the sequence output section 403, thereby to obtain a signal 503 which the spreading section 404 outputs.

The signal transmission section 405 transmits the signal 503 which the spreading section 404 outputs. The transmission of the signal can be carried out, via an antenna in the case of data communications using a cellular phone or a PHS, via a telephone line or a cable/radio LAN circuit in the case of data communications using a computer communication network, or via an optical cable.

Third Embodiment

Figure 6:
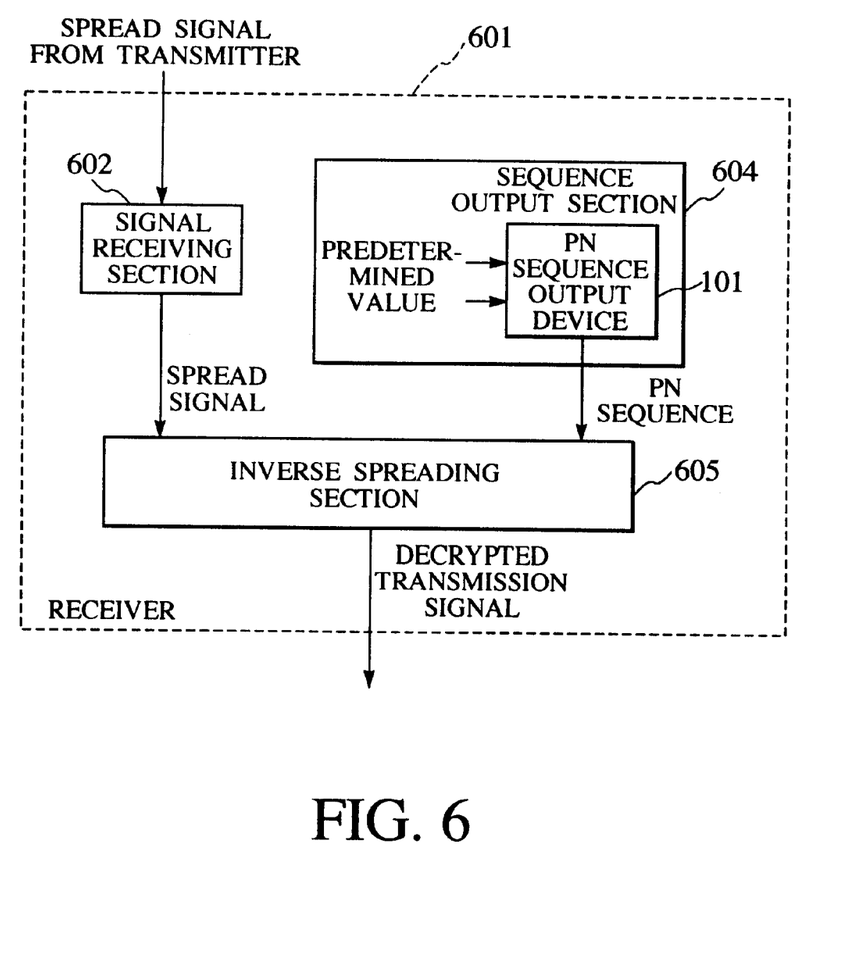
FIG. 6 is an exemplary diagram showing the schematic structure of a receiver according to the present invention.

A receiver according to an embodiment of the present invention, likewise the above-described transmitter, obtains a PN sequence using the above-described PN sequence output device, and employs this obtained PN sequence as a spreading code necessary for direct inverse-spectrum spreading. FIG. 6 is an exemplary diagram showing the schematic structure of the receiver according to the embodiment of the present invention. Explanations will now be made to the receiver with reference to FIG. 6.

A receiver 601 comprises a signal receiving section 602, a sequence output section 604 and an inverse spreading section 605.

The signal receiving section 602 receives a signal transmitted by the above-described transmitter 401. The signal receiving section 602 can be realized by an antenna or an interface made between a particular terminal and a telephone line or an optical cable line.

Those signals to be received by the signal receiving section 602 include noise or signal sent by any transmitter 401 other than the one performing data communications with the signal accepting section 602. In order to remove such unnecessary data, including the noise or the signal, the same PN sequence used by the transmitter 401, performing data communications with the signal receiving section 602, while performing the direct spectrum spreading is used. The sequence output section 604 makes the above PN sequence output section 101 accept the initial values and the degrees used by the transmitter 401 performing data communications with the signal receiving section 602, thereby outputting the output the PN sequence. Thus, the sequence output section 604 included in the receiver 601 has the same structure as that of the sequence output section 403 included in the transmitter 401.

To decrypt the transmission signal received the transmitter 401 performing data communications with the signal receiving section 602, the signal received by this transmitter 401 is multiplied sequentially by inverse numbers of the elements of the PN sequence, thereby performing the direct inverse spectrum-spreading. If synchronization is made between the transmitter 401 and the signal receiving section 602, those received signal sequences:

$s_0z[1], s_1z[2], \ldots, s_{N-1}z[N], s_Nz[1], s_{N+1}z[2], \ldots$ are multiplied sequentially by the respective elements of the PN sequence which are:

$1/z[1], 1/z[2], \ldots, 1/z[N]$, thereby to obtain a signal sequence, wherein data of the transmission signal is satisfactorily decrypted, as follows:

$s_0, s_i, \ldots s_{N-1}, s_N, s_{N+1}, \ldots$

If this signal sequence is output sequentially for a chip length time w, the transmission signal can successively be decrypted.

The synchronization between the terminals includes various techniques, such as later-described correlation detection, a technique for sharing a clock, and such techniques are included within the scope of the present invention.

With the public key cryptosystem for performing data communications between the transmitter 401 and the receiver 601, a generator 611 can generate the same initial values and the degrees as used by the transmitter 401.

The receiver 601 generates a pair of a public key and a secret key. Then, the receiver 601 sends the public key to the transmitter 401. The transmitter 401 encrypts initial values and degrees, which are to be used by the transmitter 401 itself, with the public key, and sends the encrypted initial values and the degrees to the receiver 601. The receiver 601 decrypts the encrypted data with the secret key so as to obtain the initial values and the degrees.

As the public key cryptosystem, a chaos encrypting technique, as disclosed in Japanese Patent Application No. H11-152063, can be employed.

Correlation Detection According to an Embodiment

Figure 7:
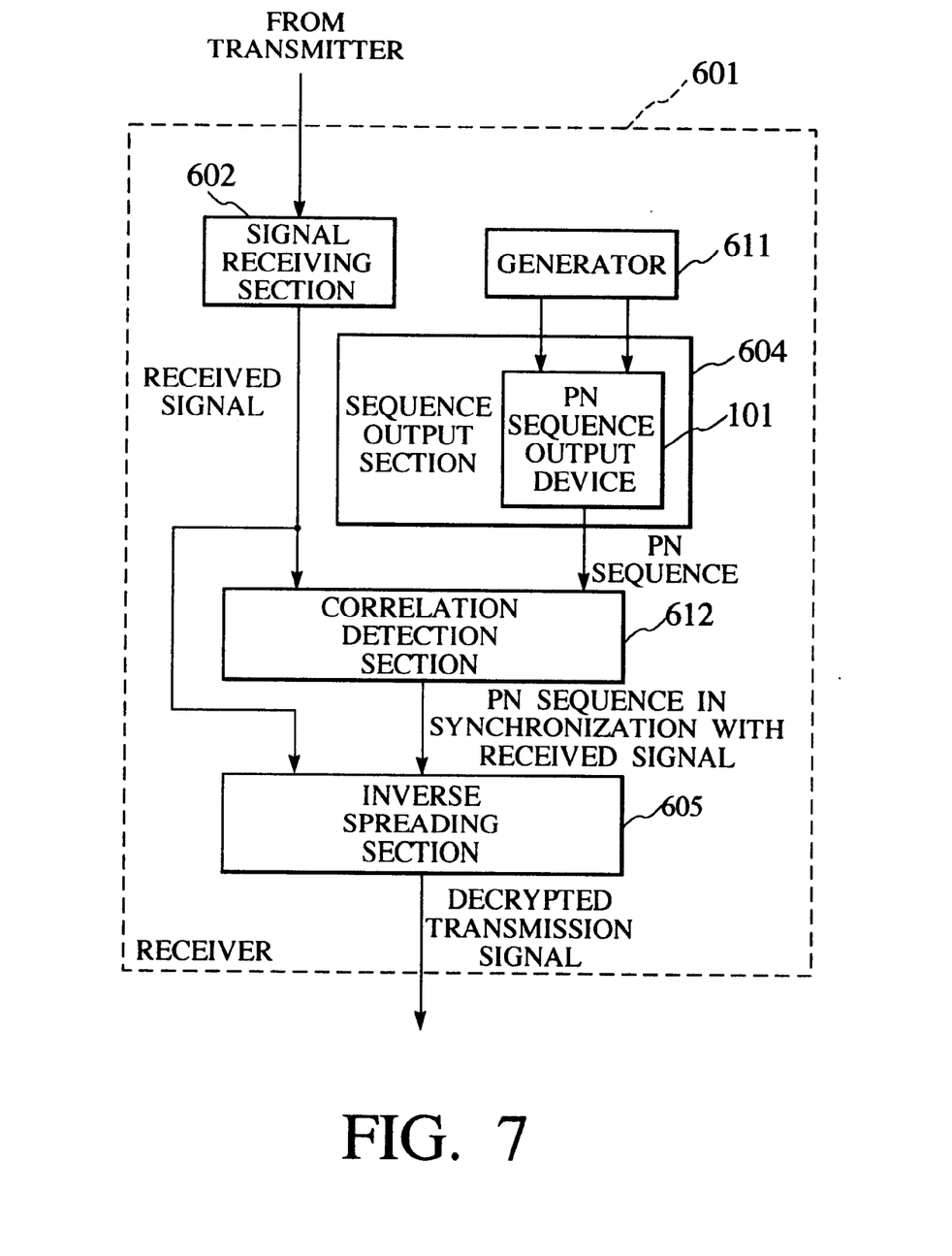
FIG. 7 is an exemplary diagram showing the schematic structure of the receiver according to the present invention.

In the case where one of PN sequences is selected and direct spectrum spreading is performed in the transmitter 401, the receiver 601 can recognize the selected PN sequence by carrying out correlation detection. At the same time, synchronization for direct inverse-spectrum spreading can be made by the correlation detection. The receiver wherein the correlation detection is carried out will now be described by referring to FIG. 7. In FIG. 7, those same components are denoted by the same reference numerals as those in FIG. 6.

The receiver 601 comprises not only the signal receiving section 602, the sequence output section 604 the inverse spreading section 605, but also the generator 611 and a correlation detection section 612.

The generator 611 outputs a pair of initial values and degrees which can be selected in the transmitter 401. The generator 611 may output just one PN sequence. In this case, it is not necessary that the correlation detection section 612 selects one pair of initial values and degrees from plural pairs of initial values and degrees. Thus, synchronization of signals can functionally be made.

The sequence output section 604 outputs PN sequences which can be selected in the transmitter 401, respectively in accordance with the initial values and the degrees output by the generator 601.

In the correlation detection section 612, the correlation between PN sequences output by the sequence output section 604 is detected. In particular, the correlation detection is performed in such a way that the "elements" of the target PN sequences are multiplied sequentially by received signals. Any well-known technique for performing the correlation detection can be adapted.

The correlation characteristics of the PN sequences employed in the present invention are preferable, thus in the case where a different PN sequence from that of the transmitter is selected in the receiver, the intensity of the signals after multiplied dramatically decreases, resulting in failure of the correlation detection.

On the contrary, in the case where the same PN sequence as that of the transmitter is selected and the correlation detection is performed, the intensity of the signal after multiplied exceeds a predetermined value. The PN sequence offset is shifted as to synchronize with the received signal, thereby achieving synchronization of the signals.

The inverse spreading section 605 multiplies the signal received by the signal receiving section 602 sequentially by "inverse numbers elements" of the PN sequence which has been synchronized with the received signal selected by the correlation detection section 612, and thereby succeeding in decrypting the transmission signal.

In the correlation detection section 612, the received signal is multiplied sequentially by the "elements" of the PN sequence. Unlike in the correlation detection section 612, in the inverse spreading section 605, the received signal is multiplied sequentially by the "inverse numbers of elements" of the PN sequence. In the former case, self-correlation and mutual correlation for the received signal are carried out, on the other hand, in the latter case, decryption of the received signal is performed.

Fourth Embodiment

A communications system according to the present invention comprises the above transmitter 401 and the above receiver 601, which receives the signal sent from the transmitter 401 and decrypts the transmission signal. If different PN sequences are to be used between the transmitter 401 and the receiver 601, the decrypting of the transmission signal will not succeed.

Accordingly, even if pairs of transmitters 401 and receivers 601 communicate therebetween at the same frequency band, confidentiality of the data transmitted between the pairs can be ensured. In addition, data communications can be made with high quality in accordance with the number of user pairs performing data communications with each other.

Particularly, in employing the PN sequences which are generated in accordance with the technique of the present invention, types of codes can dramatically be increased as compared with the conventional PN sequences. Thus, the PN sequences according to the present invention are suitable for a CDMA technique for secure data communications performed amongst an essentially-large number of users.

This application is based on Japanese Patent Application No. H11-232312 filed on Aug. 19, 1999, arid including specification, claims, drawings and summary. The disclosure of the above Japanese Patent Application is incorporated herein by reference in its entirety.

What is claimed is:

1. A Pseudorandom Noise sequence output apparatus for outputting a Pseudorandom Noise sequence having a length N ($1 \leq N$) and being generated using a Chebyshev polynomial $$T(a, \cos\theta) = \cos(a\theta), \text{ for an integer } a\ (2 \leq a),$$

said output apparatus comprising:
an accepting section which accepts
an S ($1 \leq S$) number of initial values each of which is a real number larger than $-1$ and less than 1
$X_1, X_2, \ldots, X_s$, and
an S number of degrees each of which is an integral number equal to or larger than 2
$p_1, p_2, \ldots, p_s$;
a calculation section which calculates a Pseudorandom Noise sequence having a length N
$z[1], z[2], \ldots, z[N]$
using the accepted initial values, the degrees and recurrence formulas $$x_j[1] = X_j,$$

$$x_j[m+1] = T(p_j, x_j[m]), \text{ and}$$

$$z[n] = \Pi_{j-1}^s T(p_j, x_j[n]); \text{ and}$$

an output section which outputs the calculated Pseudorandom Noise sequence.

2. The Pseudorandom Noise sequence output apparatus according to claim 1, wherein the accepted initial values are all rational numbers.

3. A transmitter comprising:
a signal accepting section which accepts a transmission signal to be input thereinto;
a sequence output section which controls the Pseudorandom Noise sequence output apparatus according to claim 1 or 2 to accept predetermined initial values and predetermined degrees and to output a Pseudorandom Noise sequence;
a spreading section which multiplies the accepted transmission signal sequentially by elements of the output Pseudorandom Noise sequence so as to perform direct spectrum-spreading; and
a transmitting section which transmits the signal which is direct-spectrum spread.

4. A receiving comprising:
a signal receiving section which receives a signal transmitted by a transmitter;
a sequence output section which controls the Pseudorandom Noise sequence output apparatus according to claim 1 or 2 to accept same initial values as initial values accepted by said transmitter and same degrees accepted by said transmitter and to output a Pseudorandom Noise sequence; and
an inverse spreading section which multiplies the received signal sequentially by inverse number of elements of the output Pseudorandom Noise sequence, performs direct inverse-spectrum spreading, and decrypts the transmission signal accepted by said transmitter.

5. A receiver comprising:
a signal receiving section which receives a signal transmitted by a transmitter;
a generation section which generates initial values and degrees;
a sequence output section which controls said Pseudorandom Noise sequence output apparatus according to claim 1 or 2 to accept the generated initial values and degrees and to output a Pseudorandom Noise sequence;
a correlation detection section which multiplies the received signal sequentially by elements of the output Pseudorandom Noise sequence so as to perform correlation detection; and
an inverse spreading section which multiplies the received signal sequentially by inverse numbers of elements of the Pseudorandom Noise sequence which is in synchronization with the signal by the correlation detection, performs direct-inverse spectrum spreading, and decrypts the transmission signal received by said transmitter, when it is determined that the generated initial values and degrees are same as the initial values and degrees of said transmitter based on a result of the correlation detection.

6. A method of outputting a Pseudorandom Noise sequence having a length N ($1 \leq N$) and being generated using a Chebyshev polynomial $$T(a, \cos \theta) = \cos(a\theta), \text{ for an integer } a \ (2 \leq a),$$

said method comprising:
an accepting step of accepting
an S ($1 \leq S$) number of initial values each of which is larger than −1 and less than 1
$X_1, X_2, \ldots, X_s$, and
an S number of degrees each of which is an integral number equal to or larger than 2
$p_1, p_2, \ldots, p_s$;
a calculation step of calculating a Pseudorandom Noise sequence having a length N
$z[1], z[2], \ldots, z[N]$
using the accepted initial values, the degrees and recurrence formulas $x_j[1] = X_j$, $x_j[m+1] = T(p_j, x_j[m])$, and $z[n] = \Pi_{j=1}^{s} T(p_j, x_j[n])$; and an output step of outputting the calculated Pseudorandom Noise sequence.

7. The method of outputting a Pseudorandom Noise sequence according to claim 6, wherein the initial values to be accepted are all rational numbers.

8. A method of transmitting a signal, comprising:
a signal accepting step of accepting a transmission signal;
a sequence outputting step of controlling the method of outputting a Pseudorandom Noise sequence according to claim 6 or 7 to include a step of accepting predetermined initial values and predetermined degrees and to output a Pseudorandom Noise sequence;
a spreading step of multiplying the accepted transmission signal sequentially by elements of the output Pseudorandom Noise sequence, and performing direct spectrum-spreading; and
a transmitting step of transmitting the signal which is direct-spectrum spread.

9. A method of receiving a signal, comprising:
a signal receiving step of receiving a signal;
a sequence outputting step of controlling said method of outputting a Pseudorandom Noise sequence according to claim 6 or 7 to include a step of accepting predetermined initial values and predetermined degrees and to output a Pseudorandom Noise sequence; and
an inverse spreading step of multiplying the received signal sequentially by inverse numbers of elements of the Pseudorandom Noise sequence, performing direct-inverse spectrum spreading, and decrypting a transmission signal.

10. A method of receiving a signal, comprising:
a signal receiving step of receiving a signal;
a generating step of generating initial values and degrees;
a sequence outputting step of controlling said method of output a Pseudorandom Noise sequence according to claim 6 or 7 to include a step of accepting the generated initial values and degrees and to output a Pseudorandom Noise sequence;
a correlation detecting step of multiplying the received signal sequentially by elements of the output Pseudorandom Noise sequence, and performing correlation detection; and
an inverse spreading step of multiplying the received signal sequentially by inverse numbers of elements of the Pseudorandom Noise sequence which is synchronized with the signal, performing direct-inverse spectrum spreading, and decrypting a transmission signal, in a case where the generated initial values and degrees meet a predetermined condition based on the correlation detection.

11. A computer readable data recording medium which records a program for realizing a process of outputting a Pseudorandom Noise sequence having a length N ($1 \leq N$) and being generated using a Chebyshev polynomial $$T(a, \cos \theta) = \cos(a\theta), \text{ for an integer } a \ (2 \leq a),$$

said program:
accepts
an S ($1 \leq S$) number of initial values each of which is a real number larger than −1 and less than 1
$X_1, X_2, \ldots X_s$, and
an S number of degrees each of which is an integral number equal to or larger than 2
$p_1, p_2, \ldots, p_s$;
calculates a Pseudorandom Noise sequence having a length N
$z[1], z[2], \ldots, z[N]$
using the accepted initial values, the degrees and recurrence formulas $x_j[1] = X_j$, $x_j[m+1] = T(p_j, x_j[m])$, and $z[n] = \Pi_{j=1}^{s} T(p_j, x_j[n])$; and outputs the calculated Pseudorandom Noise sequence.

12. The data recording medium according to claim 11, wherein the accepted initial values are all rational numbers.

13. A computer readable data recording medium which records a program for realizing processes of:
receiving a transmission signal;
controlling the program recorded on said data recording medium according to claim 11 or 12 to accept predetermined initial values and predetermined degrees, and to output Pseudorandom Noise sequence;
multiplying the received transmission signal sequentially by elements of the output Pseudorandom Noise sequence, and performing direct spectrum spreading; and
transmitting the signal which is direct-spectrum spread.

14. A computer readable data recording medium which records a program for realizing processes of:
receiving a signal;
controlling the program stored on said data recording medium according to claim 11 or 12 to accept predetermined initial values and predetermined degrees and to output a Pseudorandom Noise sequence; and
multiplying the received signal sequentially by inverse numbers of elements of the output Pseudorandom Noise sequence, performing direct-inverse spectrum spreading, and decrypting the signal.

15. A computer readable data recording medium which records a program for realizing processes of:
receiving a signal;
generating initial values and degrees;

controlling the program stored on said data recording medium according to claim 11 or 12 to accept the generated initial values and degrees and to output a Pseudorandom Noise sequence;

multiplying the received signal sequentially by elements of the output Pseudorandom Noise sequence, and performing correlation detection; and multiplying the received signal sequentially by inverse numbers of the elements of the Pseudorandom Noise sequence which is synchronized with the signal by the correlation detection, performing direct-spectrum inverse spreading, and decrypting the signal, when it is determined that the generated initial values and the degrees meet a predetermined condition based on the correlation detection.

16. The data recording medium according to claim 11, wherein said data recording medium includes a compact disk, floppy disk, hard disk, magnet-optical disk, digital video disk, magnetic tape or semiconductor memory.

17. The data recording medium according to claim 12, wherein said data recording medium includes a compact disk, floppy disk, hard disk, magnet-optical disk, digital video disk, magnetic tape or semiconductor memory.

18. The data recording medium according to claim 13, wherein said data recording medium includes a compact disk, floppy disk, hard disk, magnet-optical disk, digital video disk, magnetic tape or semiconductor memory.

19. The data recording medium according to claim 14, wherein said data recording medium includes a compact disk, floppy disk, hard disk, magnet-optical disk, digital video disk, magnetic tape or semiconductor memory.

20. The data recording medium according to claim 15, wherein said data recording medium includes a compact disk, floppy disk, hard disk, magnet-optical disk, digital video disk, magnetic tape or semiconductor memory.

21. A computer data signal embodied in a carrier wave, in order to output a Pseudorandom Noise sequence having a length N ($1 \leq N$) and being generated using a Chebyshev polynomial $$T(a, \cos \theta) = \cos(a\theta), \text{ for an integer } a\ (2 \leq a),$$

said data signal processed in a computer to:
  accept
    an S ($1 \leq S$) number of initial values each of which is a real number larger than −1 and less than 1
    $X_1, X_2, \ldots, X_s$, and
    an S number of degrees each of which is an integral number equal to or larger than 2
    $p_1, p_2, \ldots, p_s$;
  calculate a Pseudorandom Noise sequence having a length N
    $z[1], z[2], \ldots, z[N]$
    using the accepted initial values, the degrees and recurrence formulas $x_j[1] = X_j$, $x_j[m+1] = T(p_j, x_j[m])$, and $z[n] = \Pi_{j=1}^{S} T(p_j, x_j[n])$; and output the calculated Pseudorandom Noise sequence.

22. The computer data signal according to claim 21, wherein the accepted initial values are all rational numbers.

23. A computer data signal embodied in a carrier wave being processed in a computer to realize processes of:
  receiving a transmission signal;
  processing said computer data signal according to claim 21 or 22 to accept predetermined initial values and predetermined degrees, and to output a Pseudorandom Noise sequence;
  multiplying the received transmission signal sequentially by elements of the output Pseudorandom Noise sequence, and performing direct spectrum spreading; and
  transmitting the signal which is direct-spectrum spread.

24. A computer data signal embodied in a carrier wave being processed in a computer to realize processes of:
  receiving a signal;
  processing said computer data signal according to claim 21 or 22 to accept predetermined initial values and predetermined degrees and to output a Pseudorandom Noise sequence; and
  multiplying the received signal sequentially by inverse numbers of elements of the output Pseudorandom Noise sequence, performing direct-inverse spectrum spreading, and decrypting the signal.

25. A computer data signal embodied in a carrier wave being processed in a computer to realize processes of:
  receiving a signal;
  generating initial values and degrees;
  processing said computer data signal according to claim 22 or 23 to accept the generated initial values and degrees and to output a Pseudorandom Noise sequence;
  multiplying the received signal sequentially by elements of the output Pseudorandom Noise sequence, and performing correlation detection; and multiplying the received signal sequentially by inverse numbers of the elements of the Pseudorandom Noise sequence which is synchronized with the signal by the correlation detection, performing direct-spectrum inverse spreading, and decrypting the signal, when it is determined that the generated initial values and the degrees meet a predetermined condition based on the correlation detection.

\* \* \* \* \*

UNITED STATES PATENT AND TRADEMARK OFFICE
CERTIFICATE OF CORRECTION

PATENT NO.   : 6,661,831 B1
DATED        : December 9, 2003
INVENTOR(S)  : Ken Umeno

It is certified that error appears in the above-identified patent and that said Letters Patent is hereby corrected as shown below:

Column 12,
Line 19, please delete "$x_j[1] - X_j,$" and replace with -- $x_j[1] = X_j,$ --; and Column 14,
Line 19, please delete "$x_j[1] - X_j,$" and replace with -- $x_j[1] = X_j,$ --.

Signed and Sealed this

Twentieth Day of July, 2004

JON W. DUDAS
*Acting Director of the United States Patent and Trademark Office*